US012705488B2

(12) United States Patent
Xu et al.

(10) Patent No.: US 12,705,488 B2
(45) Date of Patent: Aug. 11, 2026

(54) GRAPH STRUCTURE AWARE INCREMENTAL LEARNING FOR RECOMMENDER SYSTEM

(71) Applicant: Huawei Technologies Co., Ltd., Shenzhen (CN)

(72) Inventors: Yishi Xu, Montreal (CA); Yingxue Zhang, Markham (CA); Huifeng Guo, Shenzhen (CN); Ruiming Tang, Shenzhen (CN); Yanhui Geng, Montreal (CA)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 607 days.

(21) Appl. No.: 18/111,066

(22) Filed: Feb. 17, 2023

(65) Prior Publication Data

US 2023/0206076 A1 Jun. 29, 2023

Related U.S. Application Data

(63) Continuation of application No. PCT/CN2020/109483, filed on Aug. 17, 2020.

(51) Int. Cl.
*G06N 3/082* (2023.01)
*G06N 3/045* (2023.01)

(52) U.S. Cl.
CPC ............ *G06N 3/082* (2013.01); *G06N 3/045* (2023.01)

(58) Field of Classification Search
CPC ...... G06N 3/082; G06N 3/045; G06N 3/0464; G06N 3/09; G06N 3/096; G06N 5/04; G06N 20/00; G06N 3/084; G06N 5/02
See application file for complete search history.

(56) References Cited

U.S. PATENT DOCUMENTS

| | | | |
|---|---|---|---|
| 2019/0095806 | A1 | 3/2019 | Martinez Canedo et al. |
| 2019/0251480 | A1 | 8/2019 | Garcia Duran et al. |
| 2022/0318621 | A1 | 10/2022 | Gong et al. |

FOREIGN PATENT DOCUMENTS

| | | | |
|---|---|---|---|
| CN | 107330887 | A | 11/2017 |
| CN | 110490136 | A | 11/2019 |

(Continued)

OTHER PUBLICATIONS

Wang, Xiang, et al. “Neural graph collaborative filtering.” Proceedings of the 42nd international ACM SIGIR conference on Research and development in Information Retrieval. 2019. https://arxiv.org/pdf/1905.08108 (Year: 2019).*

(Continued)

*Primary Examiner* — Michael H Hoang

(57) ABSTRACT

System and method for training a recommender system (RS). The RS is configured to make recommendations in respect of a bipartite graph that comprises a plurality of user nodes, a plurality of item nodes, and an observed graph topology that defines edges connecting at least some of the user nodes to some of the item nodes, the RS including an existing graph neural network (GNN) model configured by an existing set of parameters. The method includes: applying a loss function to compute an updated set of parameters for an updated GNN model that is trained with a new graph using the first set of parameters as initialization parameters, the loss function being configured to distil knowledge based on node embeddings generated by the existing GNN model in respect of an existing graph, wherein the new graph includes a plurality of user nodes and a plurality of item nodes that are also included in the existing graph; and replacing the existing GNN model of the RS with the updated GNN model.

16 Claims, 7 Drawing Sheets

(56) References Cited

FOREIGN PATENT DOCUMENTS

| | | | |
|---|---|---|---|
| CN | 111143705 | A | 5/2020 |
| CN | 111199242 | A | 5/2020 |
| CN | 111400560 | A | 7/2020 |
| CN | 117313830 | A | 12/2023 |
| CN | 118210983 | A | 6/2024 |
| CN | 119313985 | A | 1/2025 |
| WO | 2019220128 | A1 | 11/2019 |

OTHER PUBLICATIONS

Bianchini, Monica, et al. "Deep neural networks for structured data." Computational intelligence for pattern recognition. Cham: Springer International Publishing, 2018. 29-51. https://link.springer.com/chapter/10.1007/978-3-319-89629-8_2 (Year: 2018).*

Lee, Kibok, et al. "Overcoming catastrophic forgetting with unlabeled data in the wild." Proceedings of the IEEE/CVF international conference on computer vision. 2019. (Year: 2019) https://openaccess.thecvf.com/content_ICCV_2019/html/Lee_Overcoming_Catastrophic_Forgetting_With_Unlabeled_Data_in_the_Wild_ICCV_2019_paper.html.*

Liu, Haitao, et al. "When Gaussian process meets big data: A review of scalable GPs." IEEE transactions on neural networks and learning systems 31.11 (2020): 4405-4423. https://ieeexplore.ieee.org/stamp/stamp.jsp?tp=&arnumber=8951257 (Year: 2020).*

GU Junhua et al:"Long- and short-term recommendation model and updating method based on knowledge graph preference attention network",(Sep. 26, 2021), total 8 pages.

Yishi Xu et al:"GraphSAIL: Graph Structure Aware Incremental Learning for Recommender Systems", arXiv:2008.13517v2 [cs.IR] Sep. 2, 2020, total 8 pages.

Rex Ying, Ruining He, Kaifeng Chen, Pong Eksombatchai, William L. Hamilton, and Jure Leskovec. 2018. Graph Convolutional Neural Networks for Web-Scale Recommender Systems. In Proc. ACM Conf. Knowledge Discovery and Data Mining.

8 Jianing Sun, Yingxue Zhang, Chen Ma, Mark Coates, Huifeng Guo, Ruiming Tang, and Xiuqiang He. 2019. Multi-Graph Convolution Collaborative Filtering. In IEEE Int. Conf. on Data Mining (ICDM).

Francisco M. Castro, Manuel J. Marín-Jiménez, Nicolás Guil, Cordelia Schmid, and Karteek Alahari. 2018. End-to-End Incremental Learning.

James Kirkpatrick, Razvan Pascanu, Neil Rabinowitz, et al. 2017. Overcoming catastrophic forgetting in neural networks. Proceedings of the national academy of sciences (2017).

Sylvestre-Alvise Rebuffi, Alexander Kolesnikov, Georg Sperl, and Christoph H Lampert. 2017. icarl: Incremental classifier and representation learning. In Proceedings of the IEEE conference on Computer Vision and Pattern Recognition.

Konstantin Shmelkov, Cordelia Schmid, and Karteek Alahari. 2017. Incremental Learning of Object Detectors Without Catastrophic Forgetting. In Int. Conf. on Computer Vision (ICCV).

Yang Yang, Da-Wei Zhou, De-Chuan Zhan, Hui Xiong, and Yuan Jiang. 2019. Adaptive Deep Models for Incremental Learning: Considering Capacity Scalability and Sustainability. In Proc. ACM Conf. Knowledge Discovery and Data Mining.

William L. Hamilton, Zhitao Ying, and Jure Leskovec. 2017. Inductive Representation Learning on Large Graphs. In Proc. Adv. Neural Inf. Proc. Systems.

Thomas N. Kipf and Max Welling. 2017. Semi-Supervised Classification with Graph Convolutional Networks. In Proc. Int. Conf. Learning Representations.

Kangkang Li, Xiuze Zhou, Fan Lin, Wenhua Zeng, Beizhan Wang, and Gil Alterovitz. 2019. Sparse online collaborative filtering with dynamic regularization. Information Sciences (2019).

Steffen Rendle, Christoph Freudenthaler, Zeno Gantner, and Lars Schmidt-Thieme. 2009. BPR: Bayesian Personalized Ranking from Implicit Feedback. In Proc. Conf. Uncertainty in Artificial Intelligence.

Ruihong Qiu, Hongzhi Yin, Zi Huang, and Chen Tong. 2020. GAG: Global Attrib-uted Graph Neural Network for Streaming Session-based Recommendation. InInternational ACM SIGIR Conference on Research and Development in Information Retrieval.

Jianing Sun, Yingxue Zhang, Chen Ma, Mark Coates, Huifeng Guo, Ruiming Tang, and Xiuqiang He. 2019. Multi-Graph Convolution Collaborative Filtering. In IEEE Int. Conf. on Data Mining (ICDM).

Geoffrey Hinton, Oriol Vinyals, and Jeff Dean. 2015. Distilling the knowledge in a neural network. arXiv:1503.02531 (2015).

Yiding Yang, Jiayan Qiu, Mingli Song, Dacheng Tao, and Xinchao Wang. 2020. Distilling Knowledge from Graph Convolutional Networks. Conf. on Computer Vision and Pattern Recognition (CVPR) (2020).

* cited by examiner

GRAPH STRUCTURE AWARE INCREMENTAL LEARNING FOR RECOMMENDER SYSTEM

CROSS-REFERENCE TO RELATED APPLICATIONS

The present disclosure is a continuation application of International Application No. PCT/CN2020/109483, entitled "GRAPH STRUCTURE AWARE INCREMENTAL LEARNING FOR RECOMMENDER SYSTEM", filed Aug. 17, 2020, the entirety of which is hereby incorporated by reference.

FIELD

This disclosure relates generally to the processing of graph based data using machine learning techniques, particularly in the context of recommender systems.

BACKGROUND

An information filtering system is a system that removes redundant or unwanted information from an information stream that is provided to a human user in order to manage information overload. A recommender system (RS) is a subclass of information filtering system that seeks to predict the rating or preference a user would give to an item. RSs are often used in commercial applications to guide users to find their true interests among a growing plethora of online information.

Personalized RSs play an important role in many online services (e.g., services that a user can access through the Internet, including for example search engines, media content download and streaming services, banking services, online shopping services). Accurate personalized RSs can benefit users as well as content publishers and platform providers. RSs are utilized in a variety of commercial areas to provide personalized recommendations to users, including for example: providing video or music suggestions for streaming and download content provider platforms; providing product suggestions for online retailer platforms; providing application suggestions for app store platforms; providing content suggestions for social media platforms; and suggesting news articles for mobile news applications or online news websites.

Graphs are data structures that represent real-world objects, things or people as data points (e.g., nodes) and the relationships between the nodes as a graph topology (also referred to as a graph structure). Graphs can be useful data structures for analyzing complex real-life applications such as modelling physical systems, learning molecular fingerprints, controlling traffic networks, and recommending friends in social networks. Graphical neural networks (GNNs) can be used to combine node features and the graph structure to generate information about the graph through feature propagation and aggregation.

In RS, various relationships exist, such as social networks (user-user graph), commodity similarity (item-item graph), and user-item interaction (can be modeled as a user-item bipartite graph). The emerging techniques of GNN has been demonstrated to be powerful in representation learning and for recommendation tasks. A GNN based RS integrates node features and graph structure to generate embeddings that represent at users and items and then uses these embeddings to make recommendations.

A typical GNN based RS models the user-item interaction history as a bipartite graph and represents each user and item as a respective node in the graph. An embedding for each user node is generated by iteratively combining an embedding of the user node with embeddings of the item nodes in its local neighborhood, and embedding for each item node is generated by iteratively combining the embedding of the item node itself with the embeddings of the user nodes in its local neighborhood. Most existing methods split this process into two steps:

1) Neighborhood aggregation, in which an aggregation function operating over sets of feature vectors (e.g., each node is represented as a feature vector) to generate an aggregated neighborhood vector that is an aggregate node embedding of neighbors; and 2) Center-neighbor combination that combines the aggregated neighborhood vector (e.g. the aggregate node embedding of neighbors) with a central user/item node embedding.

A GNN based RS generates user and item embedding on graphs constructed from their relationships in a convolution manner by representing a node as a function of its surrounding neighborhood. In a bipartite graph setting, this means a user node's embedding is generated using its own embedding and the embeddings of item nodes that the user node is connected to (where a connection represents prior interaction between the underlying user and item), and similarly an item node's embedding is generated using its own embedding and the embeddings of user nodes that the item node is connected to (where a connection represents a prior interaction between the underlying item and user).

A problem of current GNN based RS is that it takes a long time to train the model. This is especially an issue for RS because it is desirable to provide the most up-to-date recommendations for users. To train and deploy a RS to an online service, typically involves three steps, namely data collection, RS model training using the collected data, and deployment of the trained model (i.e. model deployment) to the online service for inference (i.e. for use in making predictions). As users' preference and items' popularity keeps changing in the real world, there is a desire to minimize the time gap between the data collection and the model deployment, so that the deployed model is trained using the most recent data and thus reflects the most recent users' preference and items' popularity and is able to provide up-to-date recommendations.

Accordingly, there is need for solution that can reduce the time required to update a GNN based RS, enabling GNN based RSs to be updated in a more frequent manner.

SUMMARY

According to a first example aspect a method for training a recommender system (RS) is provided. The RS is configured to make recommendations in respect of a bipartite graph that comprises a plurality of user nodes, a plurality of item nodes, and an observed graph topology that defines edges connecting at least some of the user nodes to some of the item nodes, the RS including an existing graph neural network (GNN) model configured by an existing set of parameters. The method includes: applying a loss function to compute an updated set of parameters for an updated GNN model that is trained with a new graph using the first set of parameters as initialization parameters, the loss function being configured to distil knowledge based on node embeddings generated by the existing GNN model in respect of an existing graph, wherein the new graph includes a plurality of user nodes and a plurality of item nodes that are also included in the existing graph; and replacing the existing GNN model of the RS with the updated GNN model.

In at least some applications, the systems and methods disclosed herein can enable a GNN model to be incrementally updated based on new graph data without requiring that all existing graph data be used during the forward propagation stage of an interactive training process, while at the same time allowing knowledge from the existing graph data to be distilled into the updated GNN model. Among other things, the systems and methods disclosed herein may mitigate against catastrophic forgetting by the updated GNN model while at the same time substantially reducing the computing resources (e.g., processing power, memory and power consumption) that may otherwise be required for a full model retraining based on all available data.

According to one or more of the preceding aspects, the loss function is applied as part of an iterative training process during which interim sets of updated parameters are generated for training the updated GNN model, wherein during the training process the updated GNN model is configured by every interim set of updated parameters to generate interim node embeddings in respect of the new graph.

According to one or more of the preceding aspects, the loss function includes a local structure distillation component that is configured to distal, during the iterative training process, a local graph structure for the existing graph for at least some item nodes and user nodes that are included in both the existing graph and new graph.

According to one or more of the preceding aspects, the method includes determining the local structure distillation component by: (A) for each of the at least some of the user nodes that are included in both the existing graph and the new graph: determining an local neighborhood set of item nodes in the existing graph for the user node; determining an existing average local neighborhood user node embedding for the user node based on an average of embeddings generated for the item nodes in the neighborhood set by the existing GNN model; determining a new average local neighborhood user node embedding for the user node based on an average of embeddings generated for the item nodes in the neighborhood set by the updated GNN model; determining a first user value that is a dot product of: (i) an embedding generated for the user node by the existing GNN model and (ii) the existing average local neighborhood user node embedding for the user node; determining a second user value that is a dot product of: (i) an embedding generated for the user node by the updated GNN model and (ii) the new average local neighborhood user node embedding for the user node; and determining a user node difference between the first user value and the user second value; and determining a user node average distance value that is an average of the user node difference determined in respect of the at least some of the user nodes; and (B) for each of the at least some of the item nodes that are included in both the existing graph and the new graph: determining an local neighborhood set of user nodes in the existing graph for the item node; determining an existing average local neighborhood item node embedding for the item node based on an average of embeddings generated for the user nodes in the neighborhood set by the existing GNN model; determining a new average local neighborhood item node embedding for the item node based on an average of embeddings generated for the user nodes in the neighborhood set by the updated GNN model; determining a first item value that is a dot product of: (i) an embedding generated for the item node by the existing GNN model and (ii) the existing average local neighborhood item node embedding for the item node; determining a second item value that is a dot product of: (i) an embedding generated for the item node by the updated GNN model and (ii) the new average local neighborhood user node embedding for the item node; and determining an item node difference between the first item value and the second item value; and determining an item node average distance value that is an average of the user node difference determined in respect of the at least some of the user nodes. The local structure distillation component is based on a sum of the user node average distance and the item node average distance.

According to one or more of the preceding aspects, the local structure distillation component comprises a product of a local distillation hyper-parameter that is configured to control a magnitude of the local graph structure distillation and the sum of the user node average distance and the item node average distance.

According to one or more of the preceding aspects, the loss function includes a global structure distillation component that is configured to distal, during the iterative training process, a global graph structure for the existing graph for at least some item nodes and user nodes that are included in both the existing graph and new graph.

According to one or more of the preceding aspects, the method comprises determining the global structure distillation component by: determining, for each of the at least some user nodes and item nodes, a structure similarity between the existing graph and the new graph based on node embeddings generated by the existing GNN model and the updated GNN model; and determining, based on the determined structure similarities, global structure distributions for the existing graph and the new graph; wherein the global structure distillation component is based on Kullback-Leibler (KL) divergences between the global structure distributions for the existing graph and the new graph.

According to one or more of the preceding aspects the global structure distillation component is based on a global distillation hyper-parameter configured to control a magnitude of the global graph structure distillation.

According to one or more of the preceding aspects the loss function includes a self-embedding distillation component that is configured to preserve, during the iterative training process, knowledge from the existing graph for at least some item nodes and user nodes that are included in both the existing graph and new graph.

According to one or more of the preceding aspects the loss function includes a Bayesian personalized ranking (BPR) loss component.

According to a further example aspect is a processing system for implementing a recommender system (RS) that is configured to make recommendations in respect of a bipartite graph that comprises a plurality of user nodes, a plurality of item nodes, and an observed graph topology that defines edges connecting at least some of the user nodes to some of the item nodes, the RS including an existing graph neural network (GNN) model configured by an existing set of parameters. The processing system includes a processing device and a non-volatile storage coupled to the processing device and storing executable instructions that when executed by the processing device configure the processing system to perform the method of one or more of the preceding aspects.

According to a further example aspect is a non-volatile computer readable memory storing executable instructions for implementing a recommender system (RS) that is configured to make recommendations in respect of a bipartite graph that comprises a plurality of user nodes, a plurality of item nodes, and an observed graph topology that defines edges connecting at least some of the user nodes to some of the item nodes, the RS including an existing graph neural network (GNN) model configured by an existing set of parameters. The executable instructions include instructions to configure a processing system to perform the method of one or more of the preceding aspects.

BRIEF DESCRIPTION OF THE DRAWINGS

Reference will now be made, by way of example, to the accompanying drawings which show example embodiments of the present application, and in which.

Similar reference numerals may have been used in different figures to denote similar components.

DESCRIPTION OF EXAMPLE EMBODIMENTS

Figure 1:
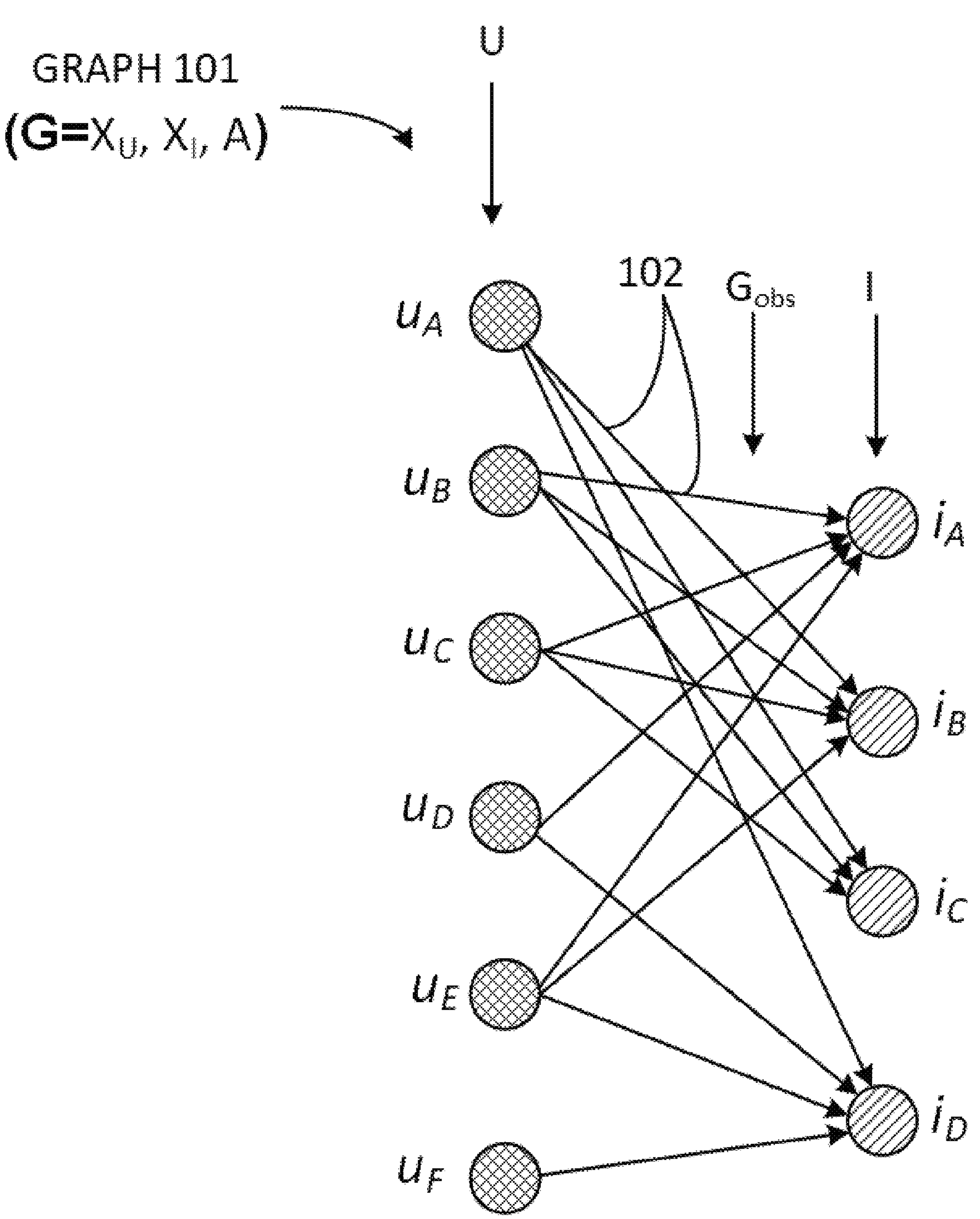
FIG. 1 is a block diagram illustrating an example of a bipartite graph.

According to example embodiments, a graph processing system is disclosed that incorporates a (GNN) based recommender system (RS), along with a method for training a GNN based RS.

In example embodiments, incremental learning and knowledge distillation are jointly applied to ensure that a GNN based RS is kept current and makes recommendations based on recent data.

Incremental learning is a method of machine learning in which input data is continuously used to extend the existing model's knowledge i.e. to further train the model. It represents a dynamic technique that can be applied when training data becomes available gradually over time. By way of examples, in the RS scenario, training data is continuously collected through the online service such as users' buying history from e-commerce platforms or listening/watching history from online music/movie streaming service.

One known approach to train models incrementally is to fine-tune an existing model only using the new data. In particular, this involves taking the parameters (e.g. weights) of a trained neural network and using those parameters as the initialization parameters for a new model being trained on new data from the same domain. However, this type of fine-tuning incremental training can result in models that suffer from catastrophic forgetting, such that the model starts to overfit the new data and forget about old knowledge.

Knowledge Distillation (KD) is the process of transferring knowledge from a large model, which is also referred to as a teacher model, to a smaller one, which is also refereed as a student model. While large models (such as very deep neural networks or ensembles of many models) have higher knowledge capacity than small models, this capacity might not be fully utilized. KD transfers knowledge from a large model to a smaller model without loss of validity. As smaller models are less expensive to evaluate, traditionally KD is used to compress models so that they can be deployed on less powerful hardware such as smart phones.

According to disclosed embodiments, KD is applied in a non-traditional application. In particular, in example embodiments, KD is applied to suppress catastrophic forgetting when performing incremental learning. In example embodiments, an existing GNN model is used as a KD teacher model and the model being updated is treated as a KD student model. In at least some applications, this can enable a model that being updated based on new data to still retain old knowledge.

The KD-based incremental learning methods and systems disclosed below may, in some applications, enable a GNN model to retain old knowledge while learning from new data. In an RS scenario, "old knowledge" can be analogized as the memory of users' and items' long-term preference and popularity respectively, while new data can be used to learn users' and items' new short-term preference and popularity respectively.

As will be described in greater detail below, example embodiments are directed to method and systems for training a GNN-based RS such that: 1) rapid changes are prevented in the node embeddings generated during fine-tuning; 2) the node embeddings that are generated during fine-tuning effectively memorize the local graph structure of each node; and 3) the node embeddings also effectively memorize the global graph structure. Thus, example embodiments are directed towards a GNN-based RS that can be fine-tuned using new data and knowledge distillation that distills the local and global structure information of the graph as well as the self-embedding of each node in the graph.

As noted above, a graph is a data structure that comprises a set of nodes and an associated graph topology that represents connections between nodes. Each node is data point that is defined by measured data represented as a set of node features (e.g., a multidimensional feature vector). The graph topology defines a set of connections (also referred to as edges) between the nodes. Each edge represents a relationship that connects two nodes. A bipartite graph is a form of graph structure in which each node belongs to one of two different node types and direct relationships (e.g., 1-hop neighbors) only exist between nodes of different types. FIG. 1 illustrates a simplified representation of a sample of an observed bipartite graph 101 that includes two types of nodes, namely user nodes $u_A$ to $u_F$ (collectively user node set U) and item nodes $i_A$ to $i_D$ (collectively item node set V) In the present disclosure, "u" is used to refer to a generic user node or nodes and "i" is used to refer to a generic item node or nodes. Each respective user node u represents an instance of a user. Each respective item node i represents an instance of a unique item. For example, in various scenarios, items may be: audio/video media items (such as a movie or series or video) that a user can stream or download from an online video content provider; audio media items (such as a song or a podcast) that a user can stream or download from an online audio content provider; image/text media items (such as new articles, magazine articles or advertisements) that a user can be provided with by an online content provider; software applications (e.g., online apps) that a user can download or access from an online software provider such as an app store; and different physical products that a user can order for delivery or pickup from an online retailer. The examples of possible categories of items provided above is illustrative and not exhaustive.

In example embodiments, user nodes $u_A$ to $u_F$ and item nodes $i_A$ to $i_F$ are each defined by a respective set of node features. For example, each user node u is defined by a respective user node feature vector $x_u$ that specifies a set of user node features. Each user node feature numerically represents a user attribute. Examples of user attributes my for example include user id, age, sex, relationship status, pet ownership, etc. Collectively, user node set U can be represented as a user node feature matrix $X_u$, where each row in the matrix is the feature vector $x_u$ for a respective user node u. Each item node i is defined by a respective item node feature vector $x_v$ that specifies a set of item node features. Each item node i feature numerically represents an item attribute. Examples of item attributes may for example include, in the case of a movie video: id, movie title, director, actors, genre, country of origin, release year, period depicted, etc. Collectively, item node set I can be represented as an item node feature matrix $X_v$, where each row in the matrix is the feature vector x, for a respective item node i.

The edges 102 that connect user nodes u to respective item nodes i indicate relationships between the nodes and collectively the edges 102 define the observed graph topology $G_{obs}$. In some example embodiments, the presence or absence of an edge 102 between nodes represents the existence or absence of a predefined type of relationship between the user represented by the user node u and the item represented by the item node i. For example, the presence or absence of an edge 102 between a user node u and an item node i indicates whether or not a user has previously undertaken an action that indicates a sentiment for or interest in a particular item, such as "clicking" on a representation of the item or submitting a scaled (e.g., 1 to 5 star) or binary (e.g. "like") rating in respect of the item. For example, edges 102 can represent the click or rating history between users and items. In illustrative embodiments described below, edges 102 convey binary relationship information such that the presence of an edge indicates the presence of a defined type of relationship (e.g. a user has previously "clicked" or rated/liked an item) and the absence of an edge indicates an absence of such a relationship. However, in further embodiments edges 102 may be associated with further attributes that indicate a relationship strength (for example a number of "clicks" by a user in respect of a specific item, or the level of a rating given by a user). In some embodiments, an edge 102 may indicate that a user has purchased, ordered or otherwise consumed an item.

In example embodiments where edges 102 convey the presence or absence of a defined relationship, the graph topology $G_{obs}$ can be represented by an adjacency matrix A that defines a matrix of binary values that indicate the presence or absence of a connecting edge between each user node u and each item node i. In some examples, adjacency matrix A corresponds to a "click" or "rating" matrix.

Thus, bipartite graph 101 (e.g., G=$X_u$, $X_i$, A) includes information about users (e.g., user node set U, represented by user node feature matrix $X_u$), information about items (e.g., item node set I, represented by item node feature matrix $X_i$), and information about the historical interactions between users and items (e.g. graph topology $G_{obs}$, represented by adjacency matrix A).

Figure 2:
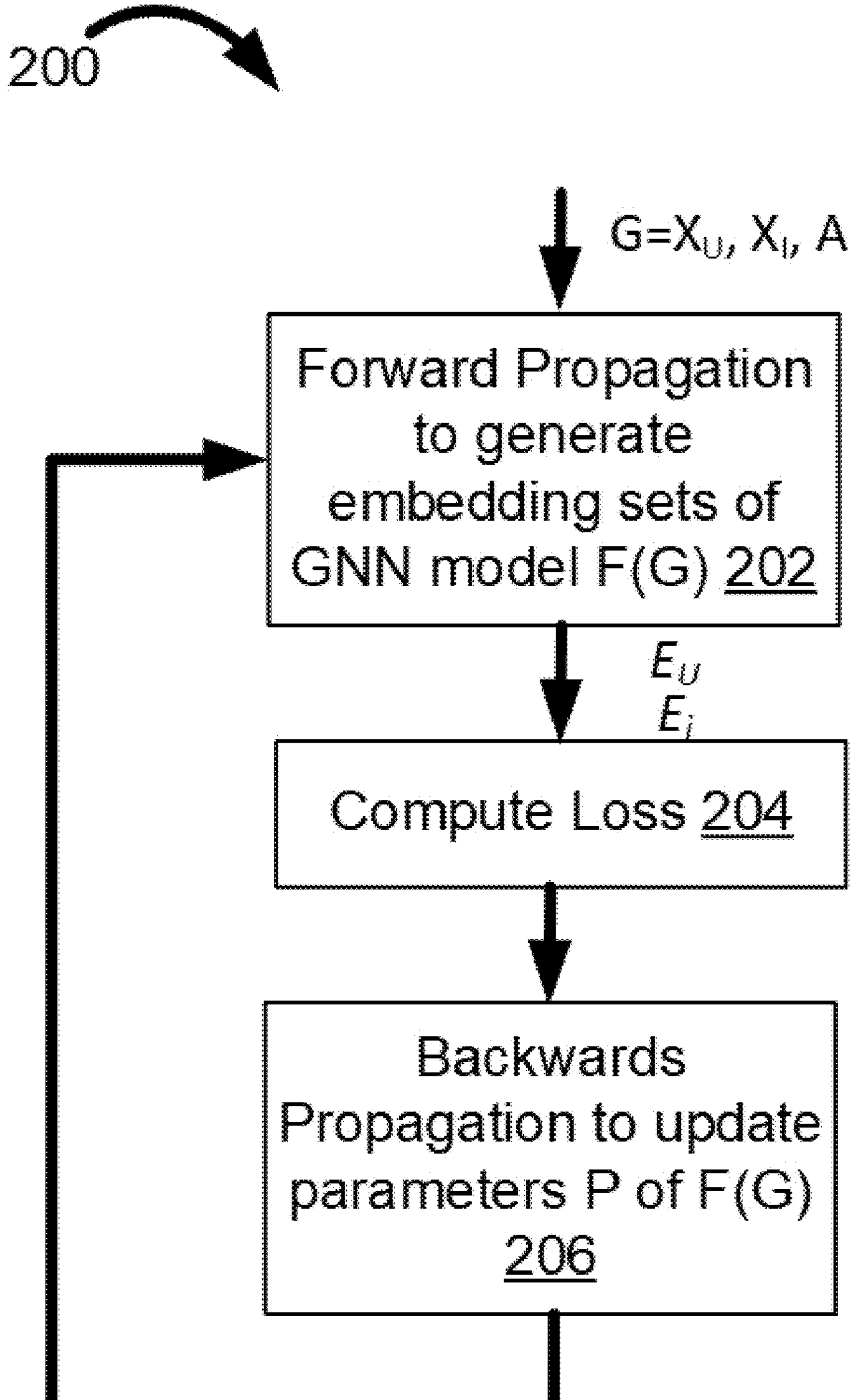
FIG. 2 is a flow diagram of a process for training a graph neural network (GNN) model to process graph structured data according to example embodiments.

FIG. 2 is a block diagram illustrating an example of a training process 200 for training a GNN model (e.g., F(G)) to generate respective embedding sets $E_U$ and $E_I$ for user node set U and item node set I, respectively. Embedding set $E_U$ includes a respective embedding $emb_u$ for each item node u, and embedding set $E_I$ includes a respective embedding $emb_i$ for each item node i. GNN model F(G) is an GNN structure that generates embedding sets $E_U$ and $E_I$ for user node sets U and I based on parameters P. Parameters P are learned during the training process 200, and can include weights that applied by matrix multiplication operations performed at one or more layers of the GNN and biases applied at such layers. In example embodiments, training process 200 applies a gradient decent optimization process that iteratively updates parameters P while repeatedly processing a training graph G to minimize a loss $\mathcal{L}$. In particular, training process 200 includes a forward propagation step 202 during which GNN model F(G) generates embedding sets $E_U$ and $E_I$ for user node set U and item node set I, respectively, using parameters P. For an initial training iteration, an initial set of parameters Pint is used. As indicated in step 204, Loss 4 is computed in respect of the generated embedding sets $E_U$ and $E_I$. As indicated in step 206, during a backward propagation step, updates for parameters P of the GNN F(G) are determined based on a defined learning rate and the loss $\mathcal{L}$. The training process 200 terminates either after a defined number of iterations (e.g. epochs) or when a threshold optimized loss is achieved, resulting in a trained GNN model F(G) that has a set of learned parameters P.

Figure 3:
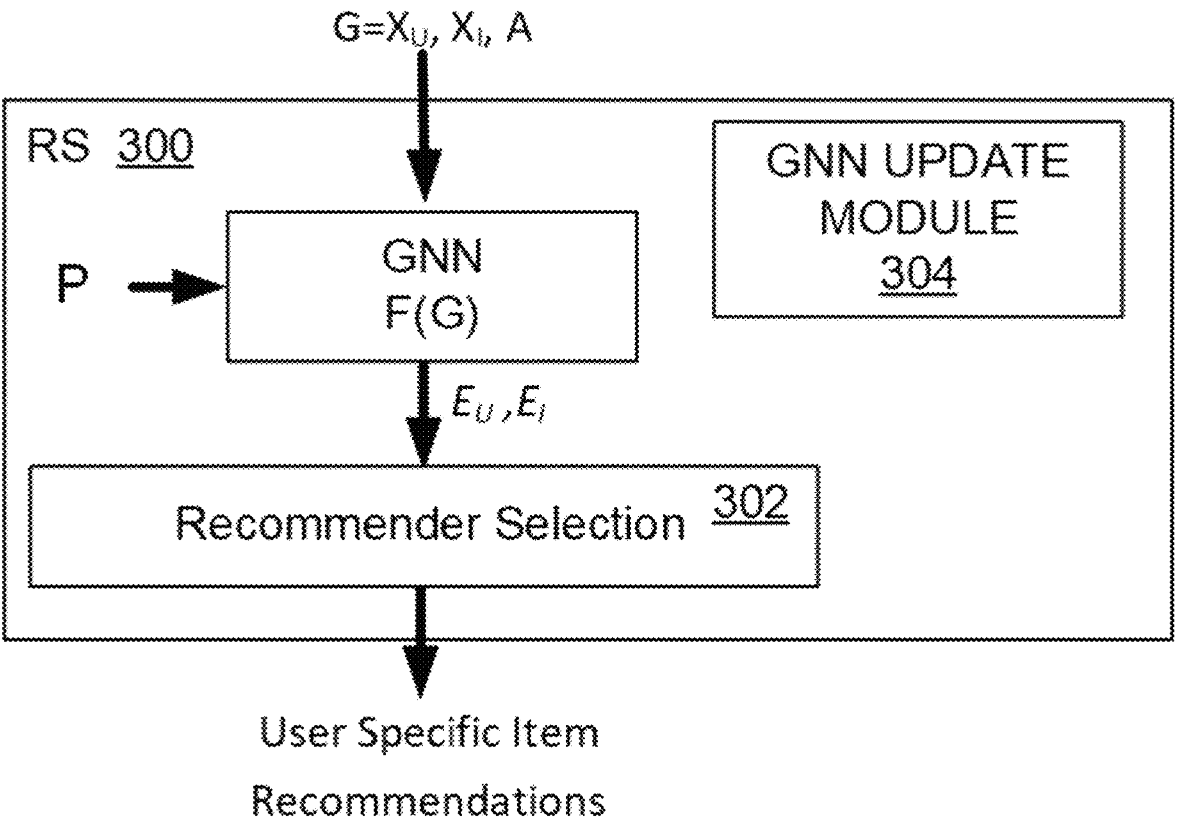
FIG. 3 is a block diagram illustrating a recommender system (RS) according to example embodiments.

With reference to FIG. 3, the trained GNN model F(G), configured with learned parameters P, can be used in a RS 300 to generate recommendations for user nodes U and item nodes I. The embedding sets $E_U$ and $E_I$ generated by GNN model F(G) can be applied to a recommender selection operation 302 that computes recommendations, for example user specific item recommendations, based on comparisons between the embeddings included in the embedding sets $E_U$ and $E_I$. By way of example, the embeddings be processed using known RS methodologies to provide user specific item recommendations. In example embodiments, recommender selection operation 302 is configured to determine user specific recommendations as follows. For each user-item pair, a respective pairwise dot product for the user node embedding $emb_u$ and item node embedding $emb_i$ is computed. Thus in the case of F item nodes i, for each user node u, F scaler value dot products will be computed. Each scaler value represents probability prediction that the user associated with a user node u will click on the respective item that the scaler value has been computed in respect of. In the case of an RS 300 that is configured to recommend up to k items, the k items that were previously unconnected to the user and that have the highest scaler values calculated in respect of the user will be selected for recommendation to the user.

Thus, in some examples user specific item recommendations can be used to generate targeted messages that are communicated to the specific users. For example, the targeted messages may be generated on an automated computer based RS operated by a platform provider (e.g., an entity that provides an online service such as a search engine, media streaming, online shopping, etc.). An electronic device associated with the user may access or receive the targeted messages through a communications network, and the presented to the user with a representation of the targeted message through a user interface of the electronic device.

In example embodiments, RS 300 is initially configured with a base GNN model $F_{t=0}$, that has been trained using training process 200 to generate embedding sets $$E_u^{t=0}, E_i^{t=0}$$

in respect of an initial of base graph $G_{t=0}$. As used in this disclosure, t denotes a time step or time frame over which user, item, and user-item relationship data is collected to populate a respective graph $G_t$, with t=0 corresponding to an initial base time frame that the base graph $G_{t=0}$ represents. Training process 200 can be used to learn a base set of parameters Po for base GNN model $F_{t=0}$, with base graph $G_{t=0}$ as the training dataset. In example embodiments, the loss that is computed in step 204 to learn the base parameters $P_{t=0}$ may be based on a known bi-partite graph RS loss computation, for example the commonly used Bayesian personalized ranking (BPR) loss ($\mathcal{L}_{BPR}$).

Accordingly, once the base GNN model $F_{t=0}$ has been trained to learn base parameters $P_{t=0}$, the trained base GNN model $F_{t=0}$ can be applied in RS 300 to generate recommendations in respect of users and items represented in the base graph $G_{t=0}$. Over time, new data will become available regarding users, items and the relationships between users and items, with the result that the base GNN model $F_0$ may become obsolete. Accordingly, in example embodiments RS 300 is configured with a GNN update module 304 that is configured to periodically update GNN model $F_t(G)$ as new user data, item data and relationship data becomes available (e.g. is collected). In various example embodiments, updates may be triggered by one or more of: a periodic schedule (for example once a day); when a threshold amount of new data has been collected (e.g. when threshold criteria regarding new users, new items and/or new relationships have been reached); analysis of data in respect of, or feedback from, from users and item providers indicates suboptimal system performance; and/or a system administrator instructs and update.

Figure 4:
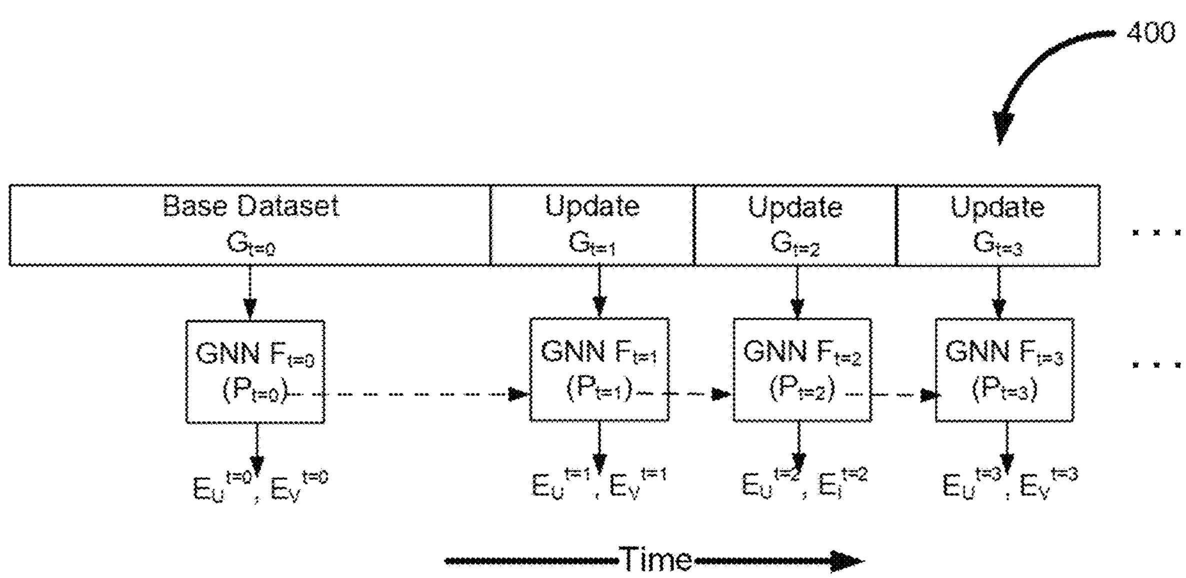
FIG. 4 is a block diagram illustrating incremental training of a GNN model according to example embodiments.

An illustrative ongoing incremental training process 400 will now be described with reference to FIG. 4. In FIG. 4, the GNN update module 304 executes the incremental training process 400 when new user data, item data and relationship data is available (e.g., collected). In FIG. 4, new user data, item data and relationship data is represented in discrete, incremental update graphs $G_{t=1}$, $G_{t=2}$, $G_{t=3}$, each of which represents data about items, users, and user-item interactions that are observed and collected in respective time frames t=1, t=2 and t=3. As noted above, in some examples, update time frames could each correspond to a day, however the time frames can be any appropriate length of time that during which a statistically appropriate amount of data is collected, and successive time frames do not have to be equal in duration. According to example embodiments, as illustrated in FIG. 4, the GNN model F(G) is periodically incrementally trained using the new data represented in graphs $G_{t=1}$, $G_{t=2}$, $G_{t=3}$, resulting in incrementally updated GNN models $F_{t=1}$, $F_{t=2}$ and $F_{t=3}$, and so on, respectively, over time. The base and incremental GNN models $F_{t=0}$, $F_{t=1}$, $F_{t=2}$, . . . all have an identical GNN model structure having the same number and configuration of NN layers and aggregating layers. Thus, the base and incremental GNN models each have the same GNN model structure, with the unique operation of each GNN model $F_{t=0}$, $F_{t=1}$, $F_{t=2}$, . . . being defined by a respective set of learned parameters $P_{t=0}$, $P_{t=1}$, $P_{t=2}$, $P_{t=3}$, . . . .

Each of the respective trained GNN models $F_{t-1}$ can be respectively incrementally further trained (e.g., fine-tuned) using the new data represented in graphs $G_t$ to generate a new trained GNN model $F_t$ by applying (i.e. executing) a training process that is similar to training process 200 of FIG. 2, subject to the distillation techniques described below that are designed to mitigate catastrophic forgetting. In order to preserve knowledge, in example embodiments, a loss function computation applied for fine-tuning includes the following components: 1) a local structure distillation component that enables node embeddings to effectively memorize the local graph structure of each node; 1) a global structure distillation component that enables node embeddings to effectively memorize the global graph structure; 3) a self-embedding distillation component to prevent rapid changes in the node embeddings generated during fine-tuning; and 4) a conventional RS loss component, for example the BPR loss.

Figure 5:
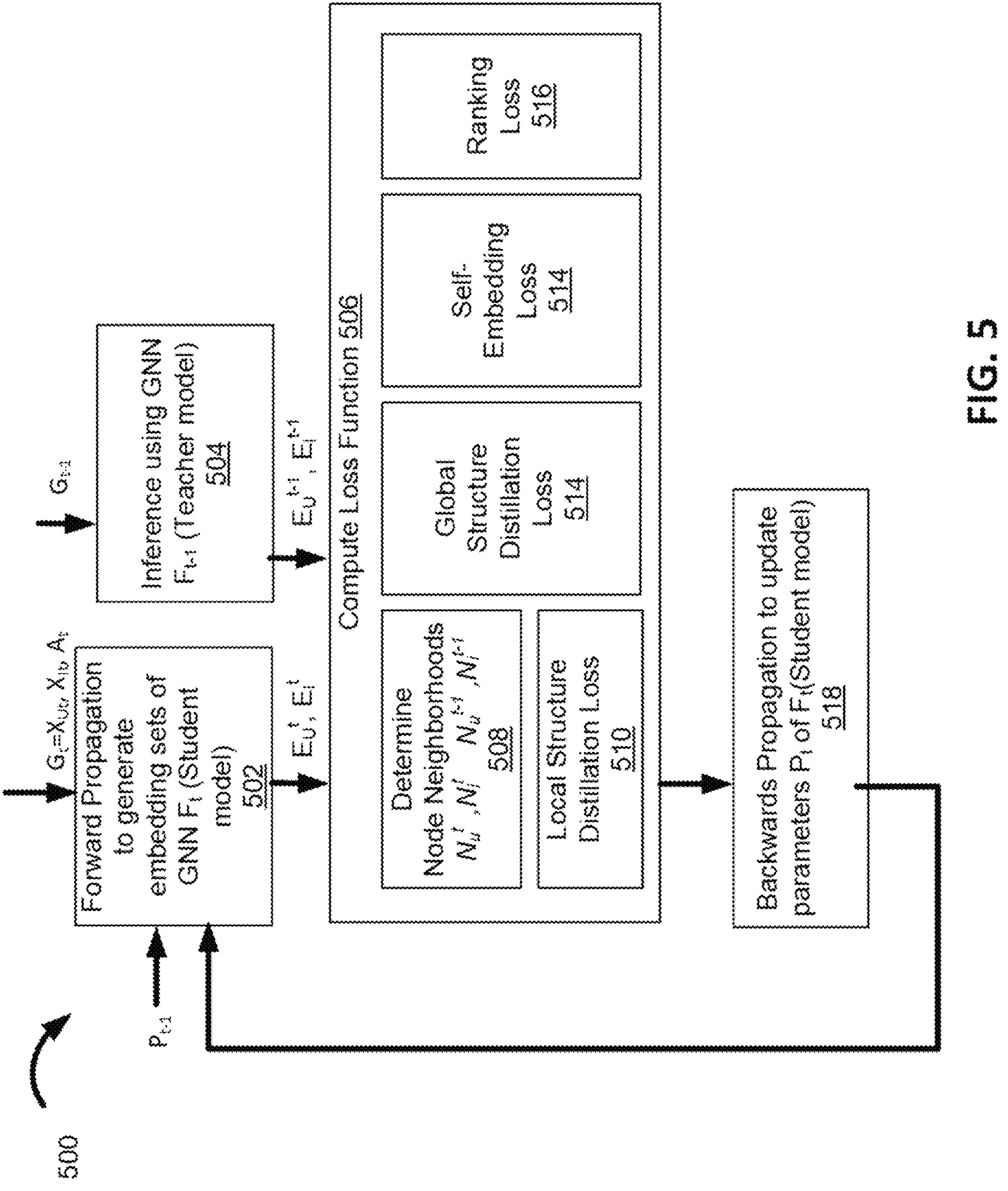
FIG. 5 is a flow diagram of a knowledge distillation process for training a GNN model of FIG. 4.

Referring to FIGS. 4 and 5, fine tuning of a trained GNN model will now be described according to example embodiments. As noted above, base GNN model $F_{t=0}$ is configured by base parameters $P_{t=0}$, which have been learned in respect of base graph $G_{t=0}$. The user, item and user-item relationship data represented in base graph $G_{t=0}$ has been collected over a base time duration t=0. During a second time duration t=1, additional user, item and user-item relationship data is acquired. This new data, which is represented in update graph $$G_{t=1} = \left(X_u^{t=1}, X_i^{t=1}, A^{t=1}\right)$$

may include: data about new interactions between existing users and existing items represented in the base graph $G_{t=0}$; new or updated feature data for existing users and/or existing items represented in the base graph $G_{t=0}$; feature data about new users and/or new items that are not represented in the base graph $G_{t=0}$; data about interactions between new users and existing items; data about interactions between existing users and new items; and data about interactions between new users and new items.

FIG. 5 illustrates a GNN model KD update process 500 that is coordinated by data update module 304 to update GNN model $F_{t-1}$ to GNN model $F_t$. In the case of fine tuning GNN model $F_{t=0}$ to GNN model $F_{t=1}$, the base model parameters $P_{t=0}$ are used as the set of initialization parameters for training update GNN model $F_{t=1}$, and the update graph $$G_{t=1} = \left(X_u^{t=1}, X_i^{t=1}, A^{t=1}\right)$$

is used as training data. Furthermore, for purposes of knowledge distillation, the GNN model $F_{t-1}$ is used as a teacher model, with the GNN model $F_t$ being a student model.

In an example embodiment, during KD update process 500, in a forward propagation step 502, student GNN model $F_t$ generates a set of user node embeddings $$E_U^t$$

that includes a respective user node embedding $$emb_u^t$$

for each user node u included in update graph $G_t$, and a set of item node embeddings $$E_I^t$$

that includes a respective item node embedding $$emb_i^t$$

for each item node i included in update graph $G_t$. For the first training iteration, the GNN model parameters $P_{t-1}$ learned in respect of teacher GNN model $F_{t-1}$ are used as the initial parameters for student GNN model $F_t$.

Teacher GNN model $F_{t-1}$ may perform forward inference (step 503) based on learned parameters $P_{t-1}$ to generate a set of teacher user node embeddings $$E_U^{t-1}$$

that includes respective user node embeddings $$emb_u^{t-1}$$

for user nodes u included in graph $G_{t-1}$, and a set of teacher item node embeddings $$E_I^{t-1}$$

that includes respective item node embeddings $$emb_i^{t-1}$$

for item nodes i included in graph $G_{t-1}$. In example embodiments, the same set of teacher user node embeddings $$E_U^{t-1}$$

and the same set of teacher item node embeddings $$E_I^{t-1}$$

will be used during the duration of the KD update process 500, such that forward inference step 503 using Teacher GNN model $F_{t-1}$ is only performed once during KD update process 500. In some examples, the set of teacher user node embeddings $$E_U^{t-1}$$

and the set of teacher item node embeddings $$E_I^{t-1}$$

may be stored in a memory of the RS 300 at the completion of training of the GNN model $F_{t-1}$, in which case forward inference step 503 will have been previously completed and need not be done as part of KD update process 500.

As indicated in step 506, a loss function is computed during each training iteration. As noted above, the loss function can include multiple components, each of which controls a different aspect of the GNN model $F_t$ training, including 1) a local structure distillation component that enables node embeddings to effectively memorize the local graph structure of each node; 2) a global structure distillation component that enables node embeddings to effectively memorize the global graph structure; 3) a self-embedding distillation component to prevent rapid changes in the node embeddings generated during fine-tuning; and 4) a conventional RS loss component, for example the BPR loss.

Local Structure Distillation Component

In an example embodiment, one of the loss components computed in is a local structure distillation component $\mathcal{L}_{local}$ local (operation 510) that supports local structure distillation during training. Typically, for a top-k RS, the most representative information is the dot product between a user embedding and an item embedding in respect of a user-item pair, which encodes a user's interest for the paired item. Component $\mathcal{L}_{local}$ local is based on a distillation of a dot product value between a center node embedding and a neighborhood representation. In particular, component $\mathcal{L}_{local}$ local is configured to discourage differences between the dot product of a node embedding and a neighborhood representation calculated based on embeddings generated by the teacher GNN model $F_{t-1}$ relative to the dot product of a node embedding for the same node and a neighborhood representation in respect of the same neighborhood calculated based on embeddings generated by the student GNN model $F_t$.

As indicated in block 508, at part of loss computation step 506, a set of user and item node neighborhoods $$N_u^t, N_i^t, N_u^{t-1}, N_i^{t-1}$$

are determined. The membership of these neighborhoods remain constant through the training process and are calculated once, as part of the first training iteration. In particular, for each user node u represented in graph $G_t$, a student graph neighborhood $$N_u^t$$

is determined that includes item nodes i that are direct neighbors (e.g., connected by an edge) in the graph $G_t$ to the subject user node u. For distillation purposes, in the event that the subject user node u was also included in the prior time slot graph $G_{t-1}$, then a teacher graph neighborhood $$N_u^{t-1}$$

is also determined for the user node u for the prior time slot graph $G_{t-1}$. Similarly, for each item node i represented in graph $G_t$, a student graph neighborhood $$N_i^t$$

is determined that includes user nodes u that are direct neighbors in the graph $G_t$ to the subject item node i. For distillation purposes, in the event that the subject item node i was also included in the prior time slot graph $G_{t-1}$, than a teacher graph neighborhood $$N_i^{t-1}$$

is also determined for the item node i for the prior time slot graph $G_{t-1}$. In some examples, the respective node neighborhoods $$N_u^t, N_i^t, N_u^{t-1}, N_i^{t-1}$$

may include all direct neighbors, and in some examples the neighborhoods may be determined by randomly sampling up to a predefined number of direct neighbor nodes.

The node neighborhoods determined in block 508, and in particular the teacher user and item node neighborhoods, $$N_u^{t-1}, N_i^{t-1},$$

are used in block 510, in combination with the teacher node embeddings and student node embeddings, to determine the local structure distillation component $\mathcal{L}_{local}$. In particular, for the teacher GNN model $F_{t-1}$, the user node u neighborhood representation can be based on an average of all of the teacher item node embeddings $$emb_i^{t-1}$$

located in the user node u neighborhood $$N_u^{t-1},$$

represented by equation (1):

$$c_{u,N_u^{t-1}}^{t-1} = \frac{1}{|N_u^{t-1}|} \sum_{i' \in N_u^{t-1}} (emb_{i'}^{t-1}) \quad \text{Eq. (1)}$$

For the student GNN model $F_t$, the user node u neighborhood representation can be based on an average of all of the user item node embeddings $$emb_i^t$$

located in the user node u neighborhood $$N_u^{t-1}.$$

Note that for the student GNN model $F_t$, the user node neighborhood that is used is based on the neighborhood in the teacher graph $G_{t-1}$, but the item embeddings are determined based on the embeddings generated by student GNN model $F_t$, as indicated in equation (2):

$$c_{u,N_u^{t-1}}^{t} = \frac{1}{|N_u^{t-1}|} \sum_{i' \in N_u^{t-1}} (emb_{i'}^{t}) \quad \text{Eq. (2)}$$

The average local neighborhood embeddings for item nodes i can similarly be determined as represented in equations (3) and (4):

$$c_{i,N_i^{t-1}}^{t-1} = \frac{1}{|N_i^{t-1}|} \sum_{u' \in N_i^{t-1}} (emb_{u'}^{t-1}) \quad \text{Eq. (3)}$$

$$c_{i,N_i^{t-1}}^{t} = \frac{1}{|N_i^{t-1}|} \sum_{u' \in N_i^{t-1}} (emb_{u'}^{t}) \quad \text{Eq. (4)}$$

The local structure distillation component $\mathcal{L}_{local}$ can be computed according to equation (5):

$$\mathcal{L}_{local} = \left( \frac{1}{|\mathcal{U}|} \sum_{u \in \mathcal{U}} \left( emb_u^{t-1} \cdot c_{u,N_u^{t-1}}^{t-1} - emb_u^t \cdot c_{u,N_u^{t-1}}^{t} \right)^2 + \frac{1}{|\mathcal{I}|} \sum_{i \in \mathcal{I}} \left( emb_i^{t-1} \cdot c_{i,N_i^{t-1}}^{t-1} - emb_i^t \cdot c_{i,N_i^{t-1}}^{t} \right)^2 \right) \lambda_{local} \quad \text{Eq. (5)}$$

Where: $\lambda_{local}$ is a hyperparameter that controls the magnitude of local structure distillation, $|U|$ and $|I|$ are the number of users and items that are present in both $G_t$ and $G_{t-1}$, and $$|N_i^{t-1}|$$

is the number of item nodes i included in neighborhood $$N_i^{t-1}.$$

In at least some scenarios, the average local neighborhood embedding $$c^{t-1}_{u,N_u^{t-1}} \text{ and } c^{t}_{u,N_u^{t-1}}$$

encode the general preferences for a user from the previous time block and the current time block, respectively. Ensuring that user node embedding and local neighborhood dot product for the student $$emb_u^t \cdot c^t_{u,N_u^{t-1}}$$

remains relatively close to that of the teacher $$emb_u^{t-1} \cdot c^{t-1}_{u,N_u^{t-1}}$$

and, similarly that the item node embedding and local neighborhood dot product for the student remains relatively close to that of the teacher, enables the resulting GNN model to explicitly preserve a user's historical preference.

In summary, as indicated by the above equations and description, in example embodiments, the local structure distillation component the local structure distillation component can be determined as follows. For user nodes u that are included in both the existing graph $G_{t-1}$ and the new graph $G_t$, a local neighborhood set $$N_i^{t-1}$$

of item nodes is determined in the existing graph $G_{t-1}$ for the user node u. An existing average local neighborhood user node embedding $$c^{t-1}_{u,N_u^{t-1}}$$

for the user node u is determined based on an average of embeddings generated for the item nodes in the neighborhood set $$N_i^{t-1}$$

by the existing GNN model $G_{t-1}$. A new average local neighborhood user node embedding $$c^{t}_{u,N_u^{t-1}}$$

is determined for the user node based on an average of embeddings generated for the item nodes in the neighborhood set $$N_i^{t-1}$$

by the updated GNN model $G_t$; determining a first user value that is a dot product of: (i) an embedding generated for the user node by the existing GNN model and (ii) the existing average local neighborhood user node embedding for the user node; determining a second user value that is a dot product of: (i) an embedding generated for the user node by the updated GNN model and (ii) the new average local neighborhood user node embedding for the user node; and determining a user node difference between the first user value and the user second value; and determining a user node average distance value that is an average of the user node difference determined in respect of the at least some of the user nodes. The above is repeated for item nodes to determine an item node average distance value that is an average of the user node difference determined in respect of the at least some of the user nodes. The local structure distillation component is based on a sum of the user node average distance and the item node average distance.

Global Structure Distillation Component

Although the local structure distillation component $\mathcal{L}_{\text{local}}$ local promotes the transfer of the teacher graphs local topological information to a student GNN graph for training the student GNN model, the local structure distillation component $\mathcal{L}_{\text{local}}$ local does not capture each node's global position information, which is the relative position of the node with respect to all the other nodes. In the context of some RS scenarios, each node's global position may encodes rich information.

Figure 6:
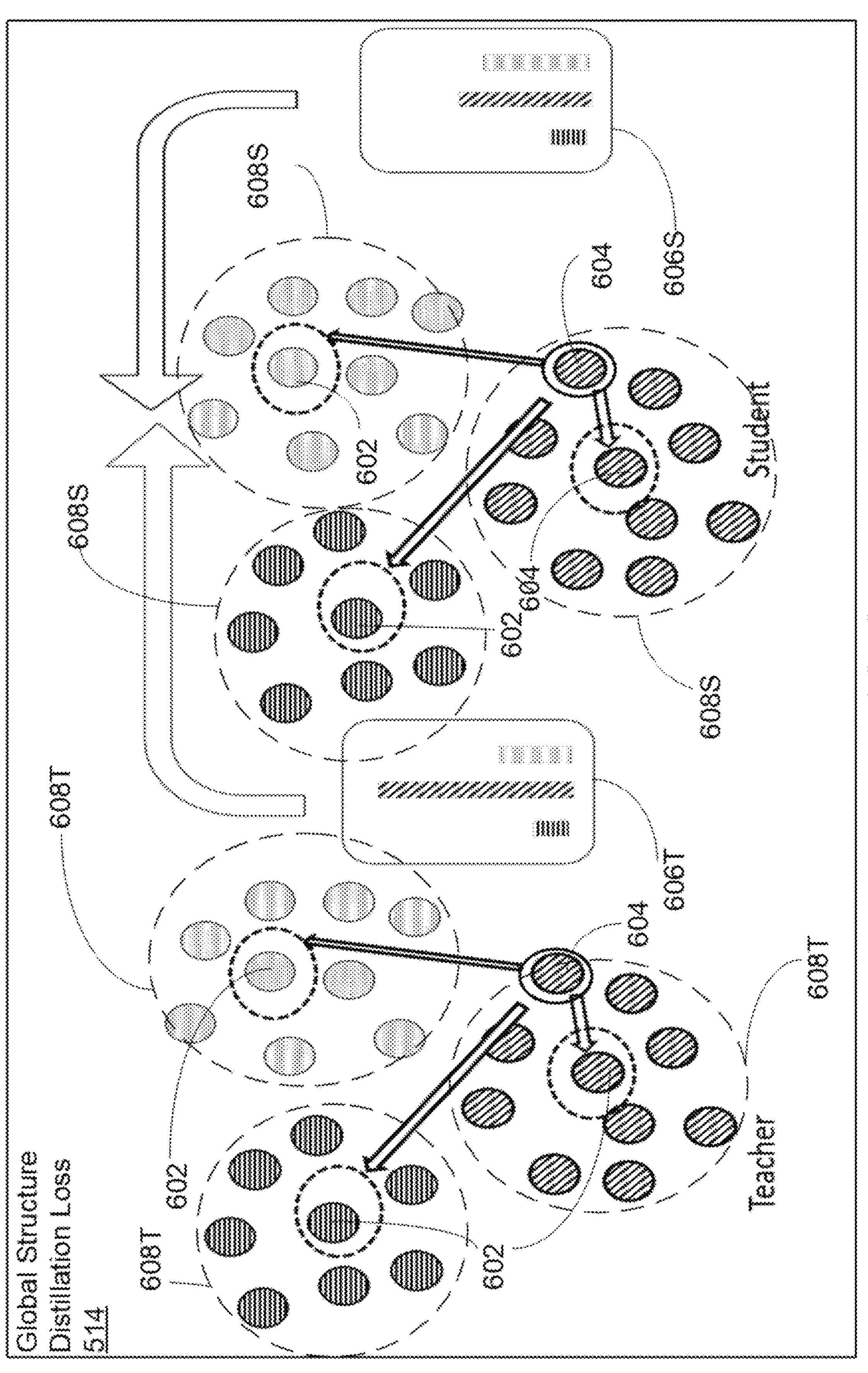
FIG. 6 is a graphical representation of a global structure distillation process.

For example, in the case of a particular user node u, the embedding distances between this user node and all other user nodes can encode a general user preference group of the user. The embedding distance between the user node and item nodes can encode which types of items the user likes. Thus, in example embodiments, the compute loss step 506 includes an operation 514 for determining a global structure distillation component $\mathcal{L}_{\text{global}}$ that has a goal of preserving embedding information that encodes a node's positional information with respect to all other nodes in the graph. Operation 514 is graphically illustrated in FIG. 6. A set of user node anchor embeddings $\mathcal{A}_u$ and a set of item node anchor embeddings $\mathcal{A}_i$ are generated to encode global structure information (node that FIG. 6 generically illustrates operation 514 as conducted in respect of either user nodes or item nodes). These anchor embeddings $\mathcal{A}_u$, $\mathcal{A}_i$ are calculated using the average embedding of clusters 608T derived using K-means clustering of the teacher user and item node embeddings, respectively, and the average embedding of clusters 608S derived using K-means clustering of the student user and item node embeddings, respectively. 2K clusters are obtained, and each cluster 608T, 608S represents a general user preference group or an item category. For each user node (e.g. node 604), two probability distributions are calculated: one which captures the probability that a user belongs to a user preference group, and one which represents the probability that an item favored by the user belongs to a particular item category. Similar distributions are constructed for each item node. These probability distributions are constructed by considering the (normalized) embedding similarities (illustrated by the relative bar charts in boxes 606T, 606S, with each bar representing the normalized embedding similarities between respective clusters 608T corresponding the teacher embeddings and respective clusters 608S corresponding to student embeddings) within each cluster 608T, 608S to a respective cluster anchor node (e.g. nodes 602). Global structure distillation component $\mathcal{L}_{\text{global}}$ functions as a loss regularization term that encourages matching of the distributions of the teacher with those of the student. In particular, component $\mathcal{L}_{global}$ is directed towards minimizing the sum of the Kullback-Leibler (KL) divergences between the teacher and student global structure distributions. For a user node u, the global structure similarity between the teacher GNN model and the student GNN model can be computed as:

$$S_{u,\mathcal{A}_u} = D_{KL}(GS^s_{u,\mathcal{A}_u} \| GS^t_{u,\mathcal{A}_u}) = \sum_{k=1}^{K} GS^s_{u,\mathcal{A}_u^k} \log\left(\frac{GS^s_{u,\mathcal{A}_u^k}}{GS^t_{u,\mathcal{A}_u^k}}\right) \quad \text{Eq. (6)}$$

where $$GS_{u,\mathcal{A}_u^k} = \frac{e^{SIM(emb_u,\mathcal{A}_u^k)/t}}{\sum_{k=1}^{K} e^{SIM(emb_u,\mathcal{A}_u^k)/t}},\ SIM(z_i, z_j) = z_i^T z_j.$$

Here $$GS^S_{u_x\mathcal{A}_u^k} \text{ and } GS^t_{u,\mathcal{A}_u^k}$$

are the k-th entries of the global structure distributions associated with K user anchor embeddings for the student GNN model and the teacher GNN model, respectively (it will be noted that in equation (6), the superscript "s" in the global structure distribution notation $$GS^s_{u,\mathcal{A}_u^k}$$

refers to the student, and the superscript "t" in the global structure distribution notation $$GS^t_{u,\mathcal{A}_u^k}\ GS^s_{u,\mathcal{A}_u^k}$$

refers to the teacher, and thus the notation "t" is used differently equation 6 that other equations in this disclosure in which t refers to the current time frame and is associated with the student GNN model).

To compute the final global structure distillation component, the average of the KL divergences is computed between the distributions over all the nodes represented in the update graph $G_t$:

$$\mathcal{L}_{global} = \lambda_{global}\left(\frac{1}{|N_u|}\sum_{u\in\mathcal{U}}\left(S_{u,\mathcal{A}_u} + S_{u,\mathcal{A}_i}\right) + \frac{1}{|N_i|}\sum_{i\in\mathcal{I}}\left(S_{i,\mathcal{A}_u} + S_{i,\mathcal{A}_i}\right)\right) \quad \text{Eq. (7)}$$

where $\lambda_{global}$ is a hyper-parameter that controls the magnitude of the global structure distillation.

In addition to the local structure distillation component $\mathcal{L}_{global}$, the global structure distillation component $\mathcal{L}_{global}$ preserves the relative position of a node with respect to all the other nodes between the teacher graph $G_{t-1}$ and the student graph $G^t$. In an RS scenario, each node's global position may provide useful information, as noted above. For a particular user node, the embedding distances between the user node 604 and different user node groups (e.g., clusters 608T in teacher graph $G_{t-1}$, and clusters 608S in the student graph $G_t$) can encode the general user preference group of the user. The embedding distance between the user node and the item nodes can encode which types of items the user likes. Global structure distillation component $\mathcal{L}_{global}$ preserves users' long-term categorical preference. Similar information is also preserved for item nodes.

Self-Embedding Distillation Component

In example embodiments, in order to preserve each user node's and each item node's own information (independent of the global graph structure and neighborhood structure), a self-embedding distillation component $\mathcal{L}_{self}$ is determined in operation 514. Component $\mathcal{L}_{self}$ is intended to directly distill the knowledge of each user's and item's embedding by adding mean squared error terms in the loss function. This ensures that during incremental training of student GNN model $F_t$, each incrementally learned embedding does not move too far from its previous position. The distillation strength for each node is controlled using a weight factor η which is proportional to the number of new records (e.g., new relationships) introduced for each node in the new graph $G_t$. The distillation loss term for self-embedding is:

$$\mathcal{L}_{self} = \lambda_{self}\left(\frac{1}{|\mathcal{U}|}\sum_{u\in\mathcal{U}}\frac{\eta_u}{\|\eta_U\|_2}\left\|emb_u^{t-1} - emb_u^t\right\|_2 + \frac{1}{|\mathcal{I}|}\sum_{i\in\mathcal{I}}\frac{\eta_i}{\|\eta_I\|_2}\left\|emb_i^{t-1} - emb_i^t\right\|_2\right), \quad \text{Eq. (8)}$$

$$\eta_u = \frac{|\mathcal{N}_u^{t-1}|}{|\mathcal{N}_u^t|},\ \eta_i = \frac{|\mathcal{N}_i^{t-1}|}{|\mathcal{N}_i^t|},$$

Where: $\lambda_{self}$ is a hyperparameter that controls the magnitude of the self-embedding distillation. $\eta_u$ and $\eta_i$ are the coefficients that control the distillation strength of each node. The introduction of distillation strength controller coefficients $\eta_u$ and $\eta_i$ to plain mean squared error (MSE) may, in some scenarios, enhance the distillation strength for nodes with richer historical records.

Complete Loss Function

As noted above, in example embodiments a conventional RS loss component, for example the BPR loss $\mathcal{L}_{BPS}$, can be included in the loss function calculation of step 506. In this regard, operation 516 computes a BPR loss component $\mathcal{L}_{BPS}$ as follows:

$$\mathcal{L}_{BPR} = \sum_{(u,i,j)\in O} -\log\sigma\left(e_u^*\cdot e_i^* - e_u^*\cdot e_j^*\right) + \lambda_{l2}\|\Theta\|^2, \quad \text{Eq. (9)}$$

where O={(u, i, j)|(u, i)∈ $\mathcal{R}^+$,(u, j)∈ $\mathcal{R}^-$)} denotes a training batch, and θ is the model parameter set. $R^+$ indicates observed positive interactions and $R^-$ indicates sampled unobserved negative interactions.

In example embodiments, the three distillation components $\mathcal{L}_{local}\mathcal{L}_{global}$, $\mathcal{L}_{self}$ are combined with BPR loss component $\mathcal{L}_{BPS}$ to distillate the knowledge from the teacher GNN model $F_{t-1}$ to the student GNN model $F_t$, providing the loss function:

$$\mathcal{L} = \mathcal{L}_{BPR} + \mathcal{L}_{self} + \mathcal{L}_{local} + \mathcal{L}_{global} \quad \text{EQ. (9)}$$

In alternative example embodiments, one or more of the distillation components $\mathcal{L}_{local}\mathcal{L}_{global}$, $\mathcal{L}_{self}$ can excluded from the loss function $\mathcal{L}$, other components can be included, and a different component can be used other than BPR loss $\mathcal{L}_{BPS}$.

As indicated in step 518, during a backward propagation step updated parameters Pt for the student GNN model $F_t(G_t)$ are determined based on the a defined learning rate and the loss function $\mathcal{L}$. The training process 500 terminates either after a defined number of iterations or when a threshold optimized loss is achieved, resulting in a trained GNN model $F_t$ that has a set of learned parameters $P_t$.

As indicated in FIG. 4, the process 500 can be repeated to train subsequent updated GNN models $F_t$ in respect of subsequent graphs $G_t$, with the prior GNN model $F_t$ being used as the teacher model.

Accordingly, example embodiments disclose a method and system for training RS 300. The RS 300 is configured to make recommendations in respect of a bipartite graph that comprises a plurality of user nodes, a plurality of item nodes, and an observed graph topology that defines edges connecting at least some of the user nodes to some of the item nodes, the RS 300 including an existing graph neural network (GNN) model $F_{t-1}$ configured by an existing set of parameters $P_{t-1}$. A loss function is applied to compute an updated set of parameters $P_t$ for an updated GNN model $F_t$ that is trained with a new graph $G_t$ using the first set of parameters $P_{t-1}$ as initialization parameters, the loss function being configured to distil knowledge based on node embeddings generated by the existing GNN model $F_{t-1}$ in respect of an existing graph wherein the new graph $G_t$ includes a plurality of user nodes u and a plurality of item nodes i that are also included in the existing graph $G_{t-1}$. The existing GNN model $F_{t-1}$ of the RS 300 is replaced with the updated GNN model $F_t$.

Processing Unit

Figure 7:
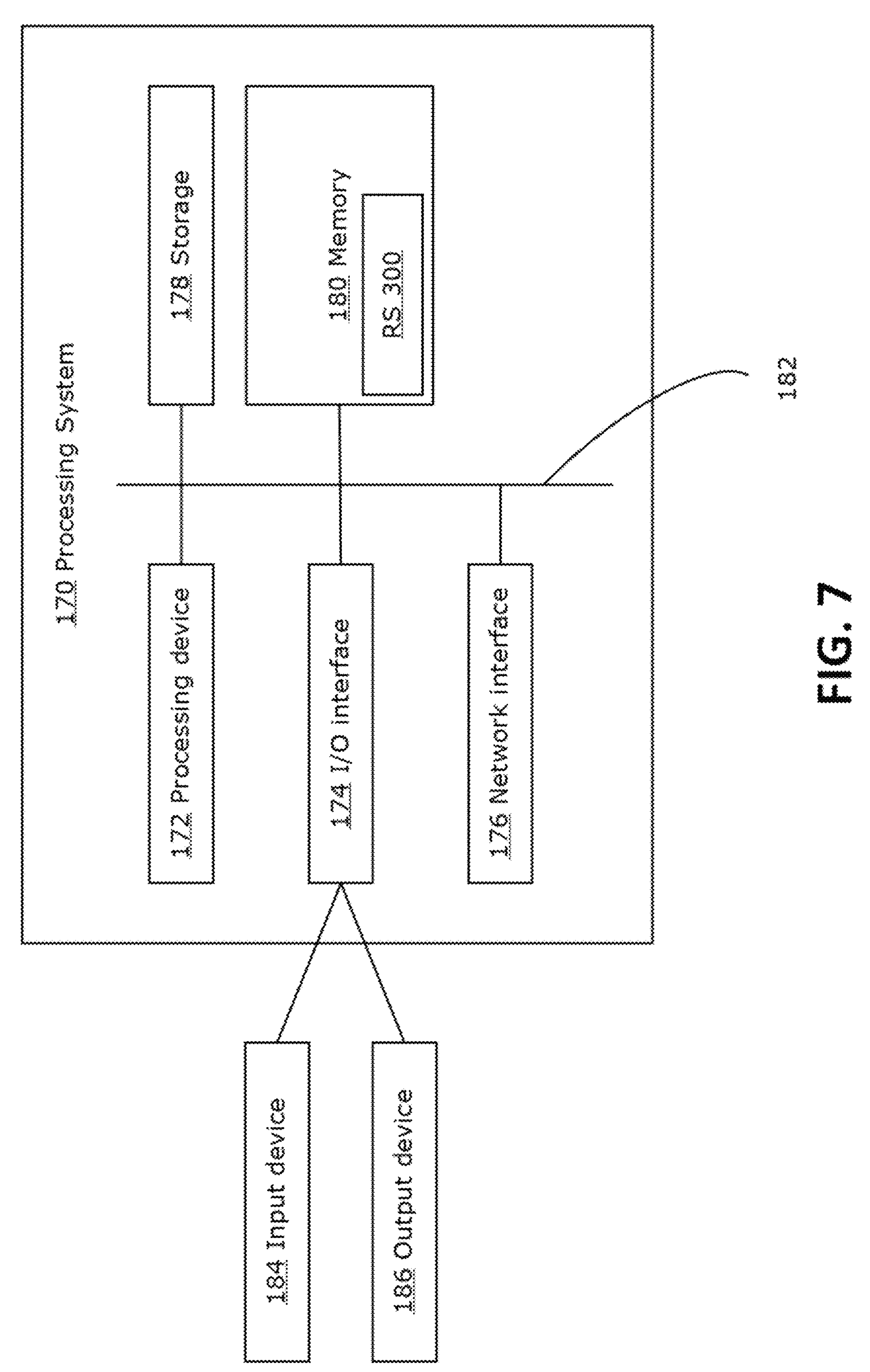
FIG. 7 is a block diagram illustrating an example processing system that may be used to execute machine readable instructions to implement the system of FIG. 3.

In example embodiments, RS 300 is computer implemented using one or more computing devices. FIG. 7 is a block diagram of an example processing system 170, which may be used to execute machine executable instructions of RS 300 or one or more of its modules and operations, including GNN model F, DNN update module 304, and recommender selection operation 302. Other processing systems suitable for implementing embodiments described in the present disclosure may be used, which may include components different from those discussed below. Although FIG. 7 shows a single instance of each component, there may be multiple instances of each component in the processing system 170.

The processing system 170 may include one or more processing devices 172, such as a processor, a microprocessor, a central processing unit (CPU), a neural processing unit (NPU), a tensor processing unit (TPU), an application-specific integrated circuit (ASIC), a field-programmable gate array (FPGA), a dedicated logic circuitry, or combinations thereof. The processing system 170 may also include one or more input/output (I/O) interfaces 174, which may enable interfacing with one or more appropriate input devices 184 and/or output devices 186. The processing system 170 may include one or more network interfaces 176 for wired or wireless communication with a network.

The processing system 170 may also include one or more storage units 178, which may include a mass storage unit such as a solid state drive, a hard disk drive, a magnetic disk drive and/or an optical disk drive. The processing system 170 may include one or more memories 180, which may include a volatile or non-volatile memory (e.g., a flash memory, a random access memory (RAM), and/or a read-only memory (ROM)). The memory(ies) 180 may store instructions for execution by the processing device(s) 172, such as to carry out examples described in the present disclosure. The memory(ies) 180 may include other software instructions, such as for implementing an operating system and other applications/functions.

There may be a bus 182 providing communication among components of the processing system 170, including the processing device(s) 172, I/O interface(s) 174, network interface(s) 176, storage unit(s) 178 and/or memory(ies) 180. The bus 182 may be any suitable bus architecture including, for example, a memory bus, a peripheral bus or a video bus.

Although the present disclosure describes methods and processes with steps in a certain order, one or more steps of the methods and processes may be omitted or altered as appropriate. One or more steps may take place in an order other than that in which they are described, as appropriate.

Although the present disclosure is described, at least in part, in terms of methods, a person of ordinary skill in the art will understand that the present disclosure is also directed to the various components for performing at least some of the aspects and features of the described methods, be it by way of hardware components, software or any combination of the two. Accordingly, the technical solution of the present disclosure may be embodied in the form of a software product. A suitable software product may be stored in a pre-recorded storage device or other similar non-volatile or non-transitory computer readable medium, including DVDs, CD-ROMs, USB flash disk, a removable hard disk, or other storage media, for example. The software product includes instructions tangibly stored thereon that enable a processing device (e.g., a personal computer, a server, or a network device) to execute examples of the methods disclosed herein.

The present disclosure may be embodied in other specific forms without departing from the subject matter of the claims. The described example embodiments are to be considered in all respects as being only illustrative and not restrictive. Selected features from one or more of the above-described embodiments may be combined to create alternative embodiments not explicitly described, features suitable for such combinations being understood within the scope of this disclosure.

All values and sub-ranges within disclosed ranges are also disclosed. Also, although the systems, devices and processes disclosed and shown herein may comprise a specific number of elements/components, the systems, devices and assemblies could be modified to include additional or fewer of such elements/components. For example, although any of the elements/components disclosed may be referenced as being singular, the embodiments disclosed herein could be modified to include a plurality of such elements/components. The subject matter described herein intends to cover and embrace all suitable changes in technology.

The content of any published papers identified in this disclosure are incorporated herein by reference.

The invention claimed is:

1. A method for training a recommender system (RS) that is configured to make recommendations in respect of a bipartite graph that comprises a plurality of user nodes, a plurality of item nodes, and an observed graph topology that defines edges connecting at least some of the user nodes to some of the item nodes, the RS including an existing graph neural network (GNN) model configured by an existing set of parameters, the method comprising:

applying a loss function to compute an updated set of parameters for an updated GNN model that is trained with a new graph using the existing set of parameters as initialization parameters, the loss function being configured to distil knowledge based on node embeddings generated by the existing GNN model in respect of an existing graph, wherein the new graph includes a plurality of user nodes and a plurality of item nodes that are also included in the existing graph, wherein the loss function includes a local structure distillation component that is configured to distil, during an iterative training process, a local graph structure for the existing graph for at least some item nodes and user nodes that are included in both the existing graph and the new graph; and determining the local structure distillation component, wherein the determining comprises:

for each of the at least some of the user nodes that are included in both the existing graph and the new graph:

determining a local neighborhood set of item nodes in the existing graph for the user node;

determining an existing average local neighborhood user node embedding for the user node based on an average of embeddings generated for the item nodes in the neighborhood set by the existing GNN model;

determining a new average local neighborhood user node embedding for the user node based on an average of embeddings generated for the item nodes in the neighborhood set by the updated GNN model;

determining a first user value that is a dot product of: (i) an embedding generated for the user node by the existing GNN model and (ii) the existing average local neighborhood user node embedding for the user node;

determining a second user value that is a dot product of: (i) an embedding generated for the user node by the updated GNN model and (ii) the new average local neighborhood user node embedding for the user node; and determining a user node difference between the first user value and the second user value;

determining a user node average distance value that is an average of the user node difference determined in respect of the at least some of the user nodes;

for each of the at least some of the item nodes that are included in both the existing graph and the new graph:

determining a local neighborhood set of user nodes in the existing graph for the item node;

determining an existing average local neighborhood item node embedding for the item node based on an average of embeddings generated for the user nodes in the neighborhood set by the existing GNN model;

determining a new average local neighborhood item node embedding for the item node based on an average of embeddings generated for the user nodes in the neighborhood set by the updated GNN model;

determining a first item value that is a dot product of: (i) an embedding generated for the item node by the existing GNN model and (ii) the existing average local neighborhood item node embedding for the item node;

determining a second item value that is a dot product of: (i) an embedding generated for the item node by the updated GNN model and (ii) the new average local neighborhood item node embedding for the item node; and determining an item node difference between the first item value and the second item value;

determining an item node average distance value that is an average of the item node difference determined in respect of the at least some of the item nodes;

wherein the local structure distillation component is based on a sum of the user node average distance value and the item node average distance value; and replacing the existing GNN model of the RS with the updated GNN model.

2. The method of claim 1 wherein during the iterative training process, interim sets of updated parameters are generated for training the updated GNN model, and the updated GNN model is configured by every interim set of updated parameters to generate interim node embeddings in respect of the new graph.

3. The method of claim 1 wherein the local structure distillation component comprises a product of a local distillation hyper-parameter that is configured to control a magnitude of the local graph structure distillation component and the sum of the user node average distance value and the item node average distance value.

4. The method of claim 1 wherein the loss function includes a global structure distillation component that is configured to distil, during the iterative training process, a global graph structure for the existing graph for the at least some item nodes and user nodes that are included in both the existing graph and the new graph.

5. The method of claim 4 wherein the method comprises determining the global structure distillation component by:

determining, for each of the at least some user nodes and item nodes, a structure similarity between the existing graph and the new graph based on node embeddings generated by the existing GNN model and the updated GNN model; and determining, based on the determined structure similarities, global structure distributions for the existing graph and the new graph;

wherein the global structure distillation component is based on Kullback-Leibler (KL) divergences between the global structure distributions for the existing graph and the new graph.

6. The method of claim 5 wherein the global structure distillation component is based on a global distillation hyper-parameter configured to control a magnitude of the global graph structure distillation component.

7. The method of claim 1 wherein the loss function includes a self-embedding distillation component that is configured to preserve, during the iterative training process, knowledge from the existing graph for the at least some item nodes and user nodes that are included in both the existing graph and the new graph.

8. The method of claim 1 wherein the loss function includes Bayesian personalized ranking (BPR) loss component.

9. A processing system for implementing a recommender system (RS) that is configured to make recommendations in respect of a bipartite graph that comprises a plurality of user nodes, a plurality of item nodes, and an observed graph topology that defines edges connecting at least some of the user nodes to some of the item nodes, the RS including an existing graph neural network (GNN) model configured by an existing set of parameters, the processing system comprising:

a processing device and a non-volatile storage coupled to the processing device and storing executable instructions that when executed by the processing device cause the processing system to perform a method including:

applying a loss function to compute an updated set of parameters for an updated GNN model that is trained with a new graph using the existing set of parameters as initialization parameters, the loss function being configured to distil knowledge based on node embeddings generated by the existing GNN model in respect of an existing graph, wherein the new graph includes a plurality of user nodes and a plurality of item nodes that are also included in the existing graph, wherein the loss function includes a local structure distillation component that is configured to distil, during an iterative training process, a local graph structure for the existing graph for at least some item nodes and user nodes that are included in both the existing graph and the new graph; and determining the local structure distillation component, wherein the determining comprises:

for each of the at least some of the user nodes that are included in both the existing graph and the new graph:

determining a local neighborhood set of item nodes in the existing graph for the user node;

determining an existing average local neighborhood user node embedding for the user node based on an average of embeddings generated for the item nodes in the neighborhood set by the existing GNN model;

determining a new average local neighborhood user node embedding for the user node based on an average of embeddings generated for the item nodes in the neighborhood set by the updated GNN model;

determining a first user value that is a dot product of: (i) an embedding generated for the user node by the existing GNN model and (ii) the existing average local neighborhood user node embedding for the user node;

determining a second user value that is a dot product of: (i) an embedding generated for the user node by the updated GNN model and (ii) the new average local neighborhood user node embedding for the user node; and determining a user node difference between the first user value and the second user value;

determining a user node average distance value that is an average of the user node difference determined in respect of the at least some of the user nodes;

for each of the at least some of the item nodes that are included in both the existing graph and the new graph:

determining a local neighborhood set of user nodes in the existing graph for the item node;

determining an existing average local neighborhood item node embedding for the item node based on an average of embeddings generated for the user nodes in the neighborhood set by the existing GNN model;

determining a new average local neighborhood item node embedding for the item node based on an average of embeddings generated for the user nodes in the neighborhood set by the updated GNN model;

determining a first item value that is a dot product of: (i) an embedding generated for the item node by the existing GNN model and (ii) the existing average local neighborhood item node embedding for the item node;

determining a second item value that is a dot product of: (i) an embedding generated for the item node by the updated GNN model and (ii) the new average local neighborhood item node embedding for the item node; and determining an item node difference between the first item value and the second item value;

determining an item node average distance value that is an average of the item node difference determined in respect of the at least some of the item nodes;

wherein the local structure distillation component is based on a sum of the user node average distance value and the item node average distance value; and replacing the existing GNN model of the RS with the updated GNN model.

10. The system of claim 9 wherein during the iterative training process, interim sets of updated parameters are generated for training the updated GNN model, and the updated GNN model is configured by every interim set of updated parameters to generate interim node embeddings in respect of the new graph.

11. The system of claim 9 wherein the local structure distillation component comprises a product of a local distillation hyper-parameter that is configured to control a magnitude of the local graph structure distillation component and the sum of the user node average distance and the item node average distance.

12. The system of claim 10 wherein the loss function includes a global structure distillation component that is configured to distil, during the iterative training process, a global graph structure for the existing graph for the at least some item nodes and user nodes that are included in both the existing graph and the new graph.

13. The system of claim 12 wherein the executable instructions cause the processing system to determine the global structure distillation component by:

determining, for each of the at least some user nodes and item nodes, a structure similarity between the existing graph and the new graph based on node embeddings generated by the existing GNN model and the updated GNN model; and determining, based on the determined structure similarities, global structure distributions for the existing graph and the new graph;

wherein the global structure distillation component is based on Kullback-Leibler (KL) divergences between the global structure distributions for the existing graph and the new graph.

14. The system of claim 13 wherein the global structure distillation component is based on a global distillation hyper-parameter configured to control a magnitude of the global graph structure distillation component.

15. The system of claim 9 wherein the loss function includes a self-embedding distillation component that is configured to preserve, during the iterative training process, knowledge from the existing graph for the at least some item nodes and user nodes that are included in both the existing graph and the new graph, and the loss function includes Bayesian personalized ranking (BPR) loss component.

16. A non-volatile computer readable memory storing executable instructions for implementing a recommender system (RS) that is configured to make recommendations in respect of a bipartite graph that comprises a plurality of user nodes, a plurality of item nodes, and an observed graph topology that defines edges connecting at least some of the user nodes to some of the item nodes, the RS including an existing graph neural network (GNN) model configured by an existing set of parameters, the executable instructions including instructions to configure a processing system to perform a method including:

applying a loss function to compute an updated set of parameters for an updated GNN model that is trained with a new graph using the existing set of parameters as initialization parameters, the loss function being configured to distil knowledge based on node embeddings generated by the existing GNN model in respect of an existing graph, wherein the new graph includes a plurality of user nodes and a plurality of item nodes that are also included in the existing graph, wherein the loss function includes a local structure distillation component that is configured to distil, during an iterative training process, a local graph structure for the existing graph for at least some item nodes and user nodes that are included in both the existing graph and the new graph; and determining the local structure distillation component, wherein the determining comprises:

for each of the at least some of the user nodes that are included in both the existing graph and the new graph:

determining a local neighborhood set of item nodes in the existing graph for the user node;

determining an existing average local neighborhood user node embedding for the user node based on an average of embeddings generated for the item nodes in the neighborhood set by the existing GNN model;

determining a new average local neighborhood user node embedding for the user node based on an average of embeddings generated for the item nodes in the neighborhood set by the updated GNN model;

determining a first user value that is a dot product of: (i) an embedding generated for the user node by the existing GNN model and (ii) the existing average local neighborhood user node embedding for the user node;

determining a second user value that is a dot product of: (i) an embedding generated for the user node by the updated GNN model and (ii) the new average local neighborhood user node embedding for the user node; and determining a user node difference between the first user value and the second user value;

determining a user node average distance value that is an average of the user node difference determined in respect of the at least some of the user nodes;

for each of the at least some of the item nodes that are included in both the existing graph and the new graph:

determining a local neighborhood set of user nodes in the existing graph for the item node;

determining an existing average local neighborhood item node embedding for the item node based on an average of embeddings generated for the user nodes in the neighborhood set by the existing GNN model;

determining a new average local neighborhood item node embedding for the item node based on an average of embeddings generated for the user nodes in the neighborhood set by the updated GNN model;

determining a first item value that is a dot product of: (i) an embedding generated for the item node by the existing GNN model and (ii) the existing average local neighborhood item node embedding for the item node;

determining a second item value that is a dot product of: (i) an embedding generated for the item node by the updated GNN model and (ii) the new average local neighborhood item node embedding for the item node; and determining an item node difference between the first item value and the second item value;

determining an item node average distance value that is an average of the item node difference determined in respect of the at least some of the item nodes;

wherein the local structure distillation component is based on a sum of the user node average distance value and the item node average distance value; and replacing the existing GNN model of the RS with the updated GNN model.

* * * * *